United States Patent
Wu et al.

(10) Patent No.: US 11,849,188 B2
(45) Date of Patent: Dec. 19, 2023

(54) OPTIMAL SUPPLEMENTAL CONTENT SELECTION IN CONTENT DELIVERY

(71) Applicant: HULU, LLC, Santa Monica, CA (US)

(72) Inventors: Dingming Wu, Beijing (CN); Chunyang Wei, Beijing (CN); Changsheng Xiang, Beijing (CN); Shulei Ma, Beijing (CN)

(73) Assignee: HULU, LLC, Santa Monica, CA (US)

( * ) Notice: Subject to any disclaimer, the term of this patent is extended or adjusted under 35 U.S.C. 154(b) by 34 days.

(21) Appl. No.: 17/653,422

(22) Filed: Mar. 3, 2022

(65) Prior Publication Data

US 2023/0262294 A1 Aug. 17, 2023

Related U.S. Application Data

(63) Continuation of application No. PCT/CN2022/076508, filed on Feb. 16, 2022.

(51) Int. Cl.
*H04N 21/4722* (2011.01)
*H04N 21/266* (2011.01)
*H04N 21/472* (2011.01)

(52) U.S. Cl.
CPC ....... *H04N 21/4722* (2013.01); *H04N 21/266* (2013.01); *H04N 21/47202* (2013.01)

(58) Field of Classification Search
CPC ............ H04N 21/812; H04N 21/2668; H04N 21/23424; H04N 21/2547; H04N 21/44204
See application file for complete search history.

(56) References Cited

U.S. PATENT DOCUMENTS

| | | | |
|---|---|---|---|
| 9,747,618 B1* | 8/2017 | Reiss | G06Q 30/0275 |
| 2020/0134663 A1* | 4/2020 | Gao | G06Q 30/0249 |
| 2020/0175448 A1* | 6/2020 | Chen | G06Q 10/105 |
| 2021/0158395 A1* | 5/2021 | Wu | G06Q 30/0247 |
| 2022/0067791 A1* | 3/2022 | Martin | G06Q 30/0206 |
| 2022/0284328 A1* | 9/2022 | Wang | G06N 5/02 |

OTHER PUBLICATIONS

Agarwal, Deepak et al., "Constrained optimization for homepage relevance", Proceedings of the 24th International Conference on World Wide Web, 2015: pp. 375-384.

(Continued)

*Primary Examiner* — Jason Salce
(74) *Attorney, Agent, or Firm* — Kwan & Olynick LLP

(57) ABSTRACT

In some embodiments, a method receives information for a delivery of instances of supplemental content for a plurality of line items. A line item is associated with an instance of supplemental content that can be delivered and a pacing curve that describes a pace of delivery over time. The method updates a parameter for the line item to generate an updated parameter based on the delivery of the instances of supplemental content and a desired pacing behavior. The updated parameter is provided to a selection system that uses the updated parameter to select an instance for delivery. The delivery of instances of supplemental content for the line item is adjusted to meet the pacing curve based on a characteristic of the pacing behavior.

20 Claims, 7 Drawing Sheets

(56) References Cited

OTHER PUBLICATIONS

Bhalgat, Anand et al., "Online allocation of display ads with smooth delivery", Proceedings of the 18th ACM SIGKDD international conference on Knowledge discovery and data mining, 2012: pp. 1213-1221.

Bharadwaj, Vijay et al., "Shale: an efficient algorithm for allocation of guaranteed display advertising", Proceedings of the 18th ACM SIGKDD international conference on Knowledge discovery and datamining, 2012: pp. 1195-1203.

Chen, Ye et al., "Real-time bidding algorithms for performance-based display ad allocation", Proceedings of the 17th ACM SIGKDD international conference on Knowledge discovery anddata mining, 2011: pp. 1307-1315.

Esfandiari, Hossein et al., "Online allocation with traffic spikes: Mixing adversarial and stochastic models", Proceedings of the Sixteenth ACM Conference on Economics and Computation, 2015: pp. 169-186.

Fang, Zhen et al., "Large-Scale Personalized Delivery for Guaranteed Display Advertising with Real-Time Pacing", 2019 IEEE International Conference on Data Mining (ICDM), pp. 190-199.

Fernandez-Tapia, Joaquin, "An analytical solution to the budget-pacing problem in programmatic advertising", Journal of Information and Optimization Sciences 40, 3 (2019), 603-614.

Grigas, Paul et al., "Profit maximization for online advertising demand-side platforms", Proceedings of the ADKDD', 2017: 17, pp. 1-7.

Hojat, Ali et al., "A unified framework for the scheduling of guaranteed targeted display advertising under reach and frequency requirements", Operations Research 2017: 65, 2, pp. 289-313.

Jaillet, Patrick et al., "Online stochastic matching: New algorithms with better bounds", Mathematics of Operations Research, 2014: 39, 3, pp. 624-646.

Kilian, Christopher T., Modern Control Technology: Components and Systems, Delmar Thomson Learning, 2001; Retrieved from the internet on Mar. 31, 2022: https://books.google.com/books/about/Modern_Control_Technology.html?id=h35SAAAAMAAJ.

Vee, Erik et al., "Optimal online assignment with forecasts", Proceedings of the 11th ACM conference on Electronic commerce, 2010, pp. 109-118.

Wu, Di et al., "Budget constrained bidding by model-free reinforcement learning in display advertising", Proceedings of the 27th ACM International Conference on Information and Knowledge Management, 2018: pp. 1443-1451.

Xu, Jian et al., "Smart pacing for effective online ad campaign optimization", Proceedings of the 21st ACM SIGKDD International Conference on Knowledge Discovery and Data Mining, 2015: pp. 2217-2226.

Yang, Xun et al., "Bid optimization by multivariable control in display advertising", Proceedings of the 25th ACM SIGKDD International Conference on Knowledge Discovery & Data Mining, 2019: pp. 1966-1974.

Zhang, Hong et al., "A Request-level Guaranteed Delivery Advertising Planning: Forecasting and Allocation", Proceedings of the 26th ACM SIGKDD International Conference on Knowledge Discovery & Data Mining, 2020, pp. 2980-2988.

Zhang, Jia et al., "Efficient delivery policy to minimize user traffic consumption in guaranteed advertising", In Proceedings of the AAAI Conference on Artificial Intelligence, 2017: vol. 31.

Zhang, Weinan et al., "Feedback control of real-time display advertising", Proceedings of the Ninth ACM International Conference on Web Search and Data Mining, 2016: pp. 407-416.

Zhao, Jun et al., "Deep reinforcement learning for sponsored search real-time bidding", Proceedings of the 24th ACM SIGKDD international conference on knowledge discovery & data mining, 2018: pp. 1021-10301021-1030.

* cited by examiner

OPTIMAL SUPPLEMENTAL CONTENT SELECTION IN CONTENT DELIVERY

CROSS-REFERENCE TO RELATED APPLICATIONS

This application is a continuation of, and claims priority to, International Application No. PCT/CN2022/076508 by WU et al., titled OPTIMAL SUPPLEMENTAL CONTENT SELECTION IN CONTENT DELIVERY, filed on Feb. 16, 2022, which is hereby incorporated by reference in its entirety and for all purposes.

BACKGROUND

In a guaranteed delivery environment, a main content provider may establish conditions with individual supplemental content providers to delivery supplemental content. The established conditions guarantee to deliver associated supplemental content a pre-specified number of times to user accounts that match targeting constraints with the delivery meeting a pacing constraint. The established conditions are referred to as line items where each line item specifies pacing constraints, a delivery goal, and targeting rules. For example, a line item may wish to target adults between the ages of 21 to 35 as targeting rules, require that the supplemental content be displayed 50 million times to this group as a delivery goal, and be delivered evenly throughout a time period as the pacing constraints.

The main content provider may have a large number of line items that compete and may attempt to allocate supplemental content slots available in main content (e.g., display opportunities) to guarantee full delivery while meeting pacing constraints for all line items. However, the main content provider may also want to optimize other objectives, such as a real time utility. The utility may be a personalization objective, such as user experience or a conversion action (e.g., selection of an item). The pacing constraint of line items is typically satisfied by periodic adjustment of a delivery strategy. Each line item may have a delivery policy with parameters that are based on the pacing constraints. A component may periodically update the policy parameters for a line item during a current period based on the pacing of the actual delivery of instances of supplemental content for the line item in a prior period. The updating of the parameters may take time to reach values that deliver the instances of supplemental content to meet the pacing constraints of the line item.

Due to the dynamic nature of the delivery system, it becomes increasingly difficult to estimate how long it will take to meet the pacing constraints or to even meet the pacing constraints. For example, some prior solutions involved adjusting each line item independently using feedback control or adjusting all line items together using a black box method, such as neural networks. The time to converge the delivery to meet the pacing constraints for line items using these methods is hard to estimate given the future performance of the parameter adjustment is not known. Further, these methods cannot achieve the optimal personalization objective because the parameter update is based on meeting the pacing constraints for line items, and not the personalization objective. For an online video delivery system in which several thousands of competing supplemental content deliveries need to be configured simultaneously, the optimal balance between meeting pacing constraints, delivery goals, and targeting rules and maximizing conversion actions by millions of concurrent users is constantly shifting in real-time and becomes increasingly difficult to achieve.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a content delivery system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A system improves the performance and efficiency of a supplemental content delivery system. For example, the performance and efficiency improves the selection logic for selecting instances of supplemental content for delivery. The selection is improved by adjusting parameters of the system to meet an expected pacing behavior of a policy for a line item. A line item may specify pacing constraints, a delivery goal, and targeting rules. The pacing constraints may be delivery rules or pacing requirements that may be referred to as a pacing curve, which represents the pacing constraints over time. The pacing behavior may describe how the actual delivery of supplemental content dynamically approaches the desired pacing curve. That is, the expected pacing behavior will result in an actual delivery of supplemental content that converges to the desired pacing curve. The characteristics of the pacing behavior may be selected based on the convergence desired for the system. For example, different pacing behaviors may be defined by how the actual delivery changes over time as the parameters are dynamically adjusted, such as the pacing behavior may be critically damped, overdamped, or underdamped. Overdamping may not overshoot the pacing curve, underdamping may overshoot the pacing curve, and critically damped may in between the border of overdamping and underdamping performance. By setting the parameters for the policy for selecting a line item to meet the pacing behavior and not the pacing curve, the convergence of the system may be guaranteed based upon the characteristics of the pacing behavior. This is an improvement over the prior techniques described in the Background, which do not guarantee convergence and may be slower to deliver instances of supplemental content optimally per requirements. In this case, the operation of the supplemental content delivery system is improved as instances of supplemental content are delivered more efficiently.

System Overview

Figure 1:
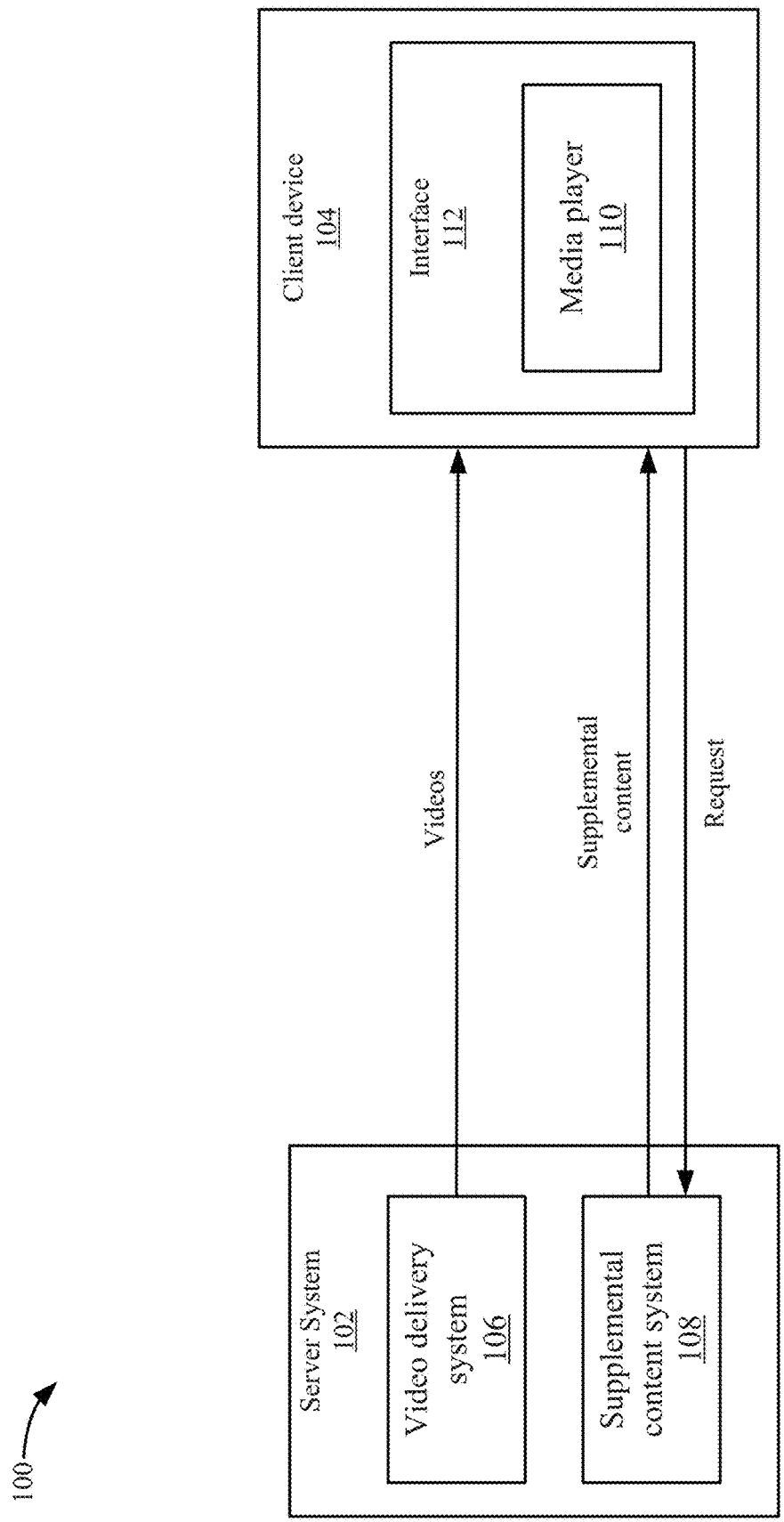
FIG. 1 depicts a simplified system for delivering supplemental content according to some embodiments.

FIG. 1 depicts a simplified system 100 for delivering supplemental content according to some embodiments. System 100 includes a server system 102 and a client device 104. Although a single instance of server system 102 and client device 104 is shown, multiples instances will be appreciated. For instance, server system 102 may include multiple servers or other computing devices to provide the functionality described herein. Also, system 100 may include multiple client devices 104 that interact with server system 102.

Server system 102 may include a video delivery system 106 that delivers videos to client devices 104. In some embodiments, video delivery system 106 may use a content delivery network (CDN) (not shown) to deliver the videos. The videos may be associated with main content, which is content that is requested by a user account associated with client device 104. For example, a user account may request a movie, an episode of a show, etc. Although videos are described, it will be understood that other content may also be delivered as the main content, such as a website, page of content, etc.

Client device 104 may be a computing device, such as a smartphone, living room device, personal computer, tablet, television, set-top box, etc. Client device 104 may include an interface 112 that may display the main content, such as videos. For example, a media player 110 may play back a video that is requested from video delivery system 106. A user account may use client device 104 and may be associated with video delivery system 106 (e.g., the user account signs up for the service). Also, video delivery system 106 may store characteristics for the user account, such as an age of a user, watch history, etc.

At some point during a break in the main content, which may be referred to as a supplemental content slot, an opportunity, break, etc., such as during a break in the video or when a page is displayed, a supplemental content agent 108 may select instances of supplemental content to deliver to client device 104. An instance of supplemental content may be different from the main content, such as the supplemental content may not have been originally requested by client device 104 as compared to the request for the main content. An example of supplemental content may be an advertisement that is displayed during a break in the main content. A supplemental content agent 108 may detect when supplemental content should be displayed. For example, during the main content, a break may occur in which one or more instances of supplemental content should be displayed. In other embodiments, supplemental content may be displayed on a site, such as a web page, simultaneously with the main content that a user account is viewing. It will be understood that supplemental content may be displayed in different scenarios.

In some embodiments, supplemental content agent 108 may communicate with other devices or modules to determine the supplemental content to display. For example, supplemental content system 108 may receive a list of line items that have instances of supplemental content that are eligible to be displayed during a break. The list may be based on different factors, such as targeting rules that match the characteristics of the user account or may be any line items that are available for that break. When the line item is selected, server system 102 sends an instance of supplemental content for the line item to client device 104. Client device 104 may then display the instance of supplemental content. The display of the instance of supplemental content may form an impression, which is when an instance of supplemental content is displayed to the user account.

Supplemental content system 108 delivers instances of supplemental content for line items such that the delivery for each line item converges to the respective desired pacing curve for each line item in a selected manner of performance referred to as a pacing behavior. As will be discussed in more detail below, parameters of a policy for a line item may be adjusted to meet an expected pacing behavior instead of meeting the pacing constraints for the line item. Eventually, the delivery of the instances of supplemental content for the line item will meet the pacing constraints with a designed convergence performance based on the expected pacing behavior. This results in an improvement of a device that is delivering instances of supplemental content. For example, the device converges to meet the pacing constraints faster compared to using methods detailed in the Background. Also, the delivery of instances of supplemental content may be delivered more efficiently and obtain a performance that is closer to the desired pacing constraints faster. For example, a pacing behavior that converges to the desired pacing curve faster delivers instances of supplemental content with fewer periods of overshooting or undershooting the pacing constraints. The process also achieves theoretical maximum utility without compromising control of the pacing. For example, a stable environment may meet the following two conditions of (1) ad requests at every unit time have the same count (even speed) and (2) ad requests are independently identically distributed. Solving the maximal utility problem with a demand constraint (only total amount constraint, not even pacing constraint) leads to a solution with every deal pacing evenly. In other words, in this case, the even pacing requirement does not harm the maximal utility objective because the optimal policy (from utility perspective alone) naturally has an even pacing feature.

The following will now describe supplemental content system 108 in more detail.

Supplemental Content System

Figure 2:
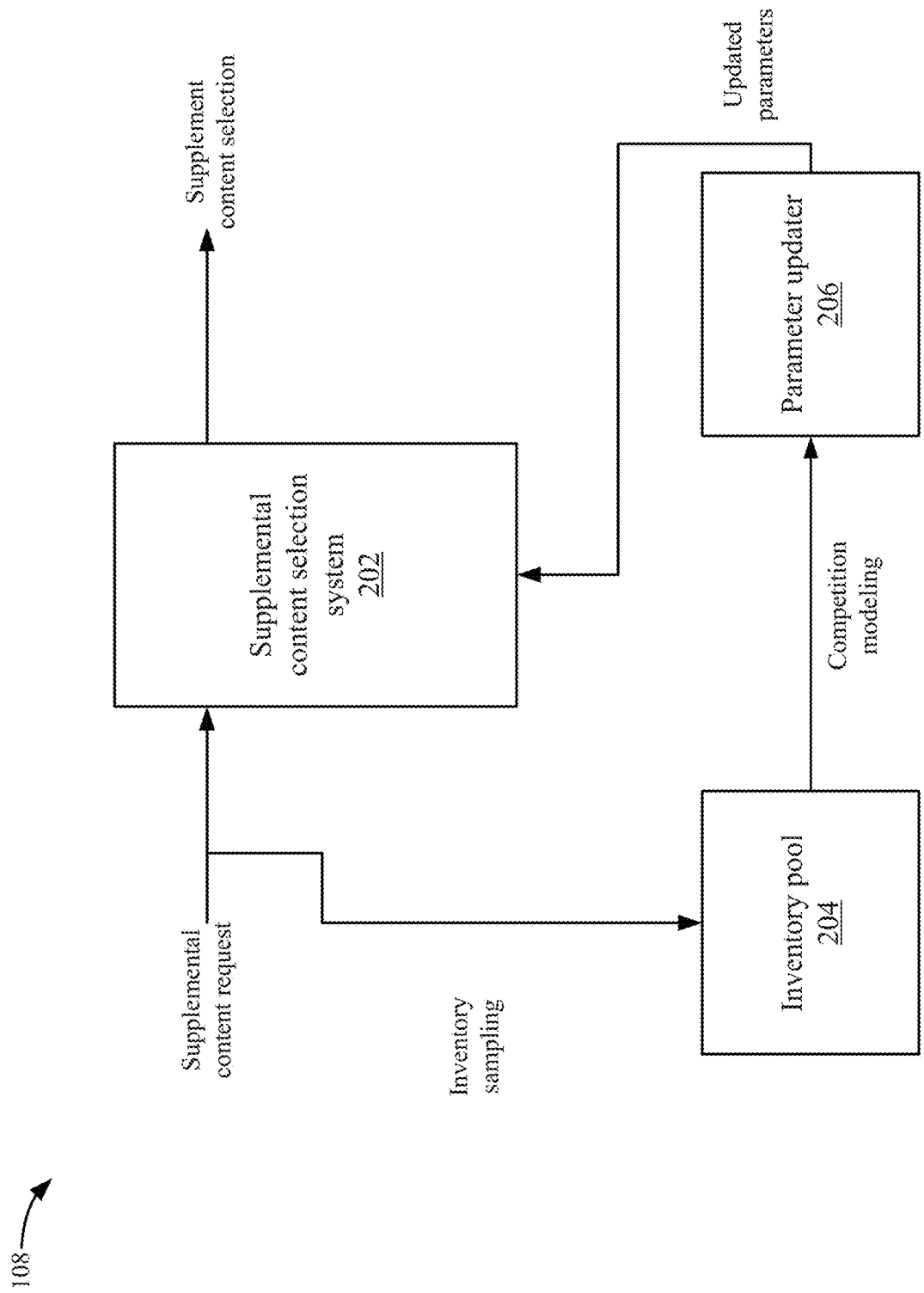
FIG. 2 depicts a more detailed example of a supplemental content system according to some embodiments.

FIG. 2 depicts a more detailed example of supplemental content system 108 according to some embodiments. Supplemental content collection system 108 includes a supplemental content selection system 202, an inventory pool 204, and a parameter updater 206. Supplemental content selection system 202 may be a real-time delivery system that responds to requests. For example, supplemental content selection system 202 receives and processes a supplemental content request. In some examples, during a break in a video, client device 104 may send a request for supplemental content to display during the break. Characteristics for the user account that is watching the video may also be received.

Supplemental content selection system 202 may maintain parameters for each line item, and values for those parameters are used to select a line item for the request. The selection may select a line item that maximizes a utility value and a parameter value. The selection process will be described in greater detail below in FIG. 3.

Inventory pool 204 may describe a history that is associated with supplemental content requests. For example, inventory pool 204 may store information that is used to process supplemental content requests. In some examples, inventory pool 204 may store the line items that qualified for supplemental content requests and a utility score for each qualified line item. Inventory pool 204 may be used to model competition between the line items to optimize the system performance. Competition occurs when multiple instances of supplemental content qualified for a single request, but only one can be selected. This list of instances of supplemental content can capture the competition that results for a request. The utility score for every qualified instance of supplemental content is stored because the system is aimed at maximizing this score. The selected instance of supplemental content may be used, but may not be necessary because it is the result of the competition, but not the competition itself. For example, if there are two instances of supplemental content named instance A and instance B, and inventory pool 204 includes three sampled requests: 1, 2, and 3. Inventory pool 204 may include the following information:

Request 1: {qualified instances: A; utility score: 0.1}
Request 2: {qualified instances: A, B; utility score: 0.0, 0.4}
Request 3: {qualified instances: A; utility score: −0.1}

In the above, the utility scores correspond to the qualified instances, such as in Request 2, instance A has a utility score of 0.0 and instance B has a utility score of 0.4. The information used in inventory pool 204 includes the information used supplemental content selection system 202 to perform real-time selection of an instance for a request.

Parameter updater 206 may receive information for supplemental content requests from inventory pool 204, such as the line items that qualified for supplemental content requests and a utility score for each qualified line item. For example, information from randomly sampled supplemental content requests within a time period may be used. In some examples, randomly sampled requests within the last hour may be used. However, all requests within the last hour may also be used. Also, parameter updater 206 may receive the cumulative delivery count for a line item and expected pacing curve for each line item. For example, for instance A, parameter updater 206 receives {expected pacing curve X; current delivery: Y}, and for instance B, parameter updater 206 receives {expected pacing curve Z; current delivery: W}, wherein W, X, Y, and Z are values based on the pacing constraints and real-time delivery of instances for the respective line items.

Parameter updater 206 then updates the parameters for line items based on the input. For example, the parameters are updated for a line item such that the upcoming actual delivery of instances of supplemental content for line items converge to meet the defined pacing behavior for respective instances. The pacing behavior for all line items may be updated together instead of updating each line item independently. This may achieve system-wide optimization and reduce oscillation where individual line items may be adjusted, and then other line items may need to be adjusted to compensate for the prior adjustment. However, it is possible for line items to be updated individually or in groups. Once parameters are updated, parameter updater 206 provides the updated parameters to supplemental content selection system 202 for use in real-time selection of line items for requests.

The process of the selection of line items will now be described in more detail. Guaranteed delivery may have demand-side line items and a supply side supplemental content slots. Line item j has a guaranteed delivery goal noted as di where j∈{1, 2, . . . , n} is the line item index. Each line item has its predefined targeting rules. A line item may be delivered only on the supplemental content slots where all its targeting rules are met. The supplemental content slots may be selected based on: 1) the qualified line item list and 2) the utility of each line item. The following will describe a process that may maximize total utility under the pacing constraints.

Figure 3:
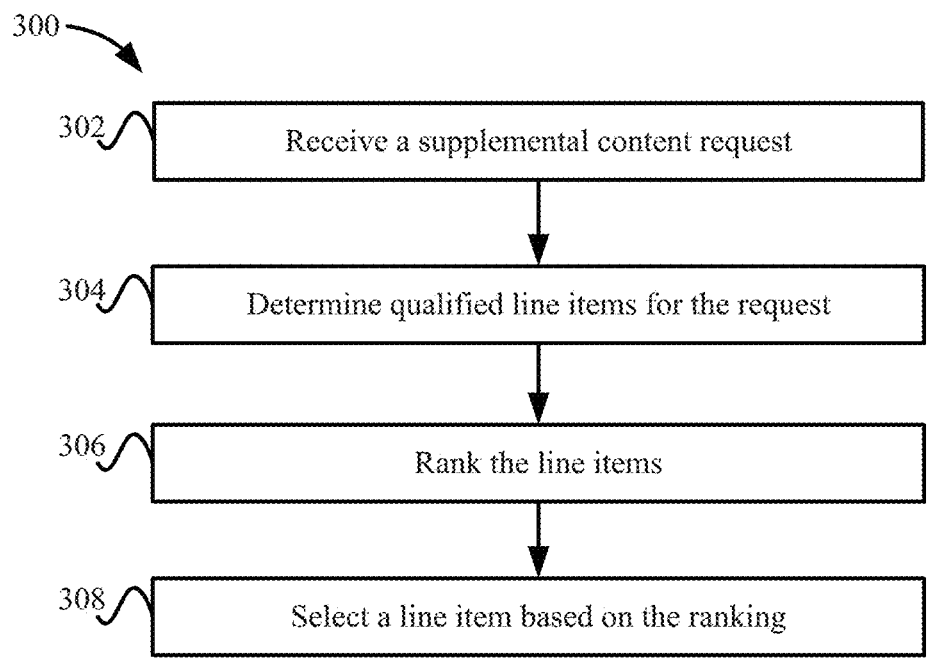
FIG. 3 depicts a simplified flowchart of a method for selecting an instance of supplemental content according to some embodiments.

FIG. 3 depicts a simplified flowchart 300 of a method for selecting an instance of supplemental content according to some embodiments. At 302, supplemental content selection system 202 receives a supplemental content request. The request may be for an opportunity during a break in a video and be associated with characteristics of a user account.

At 304, supplemental content selection system 202 determines qualified line items for the request. In one method, all qualified line items are first selected based on the characteristics associated with the supplemental content request. For example, the qualified line items may be line items that meet targeting requirements associated with the request. In some examples, if the user account is associated with a user between the age of 21 to 35, then line items that have a targeting requirement within that age range qualify for this supplemental content request. Multiple different characteristics may be used to determine qualified line items.

At 306, supplemental content selection system 202 ranks the line items. For example, after selecting the qualified line items, supplemental content selection system 202 may calculate a value that attempts to maximize the utility of a line item under the pacing constraints. In some examples, for each line item, supplemental content selection system 202 calculates a value that combines a parameter value and a utility value, such as the sum of a parameter value and a utility value:

$$\alpha_1+u_1, \alpha_2+u_2, \ldots, \alpha_q+u_q,$$

where $\alpha$ is the parameter and u is the utility. Supplemental content selection system 202 may rank the line items based on respective sums, such as from a highest sum to a lowest sum. As discussed above, the utility may be the value that is provided by delivering the instance of supplemental content. The higher the value, the higher utility is received from selecting the line item. Also, the parameter may represent how closely a line item is being delivered according to its pacing constraints. A higher value (e.g., positive) for a parameter may indicate that the line item is under delivering versus its pacing constraints and a lower value (e.g., negative) may indicate that the line item is over delivering while a neutral value (e.g., 0) indicates that the line item is delivering close to the pacing constraints. A line item that is under delivering should be delivered more and a line item that is over delivering should be delivered less. Utility may be calculated using different methods. For example, a personalization objective is defined and lines items that are closer to meeting the objective receive a higher utility. For example, if the system is used to optimize the user account conversion rate of selecting a recommended instance of supplemental content, the utility score can be the predicted conversion rate. If the system is aimed at improving user experience, the utility can be the predicted user engagement score.

Then, at 308, supplemental content selection system 202 selects a line item based on the ranking. The system may have N opportunities where supplemental content selection system 202 attempts to maximize the total combined score of the parameter value and the utility value, which may be referred to as marginal utility of the additional benefit that is received by delivering the instance of supplemental content. For an opportunity, supplemental content selection system 202 finds the line item offering the greatest value among the ranked sums, such as the line item with the largest sum of the parameter and utility. For example, for the line item with the largest sum, supplemental content selection system 202 determines if the sum is greater than a threshold, such as 0. If so, supplemental content selection system 202 selects this line item for delivery in the opportunity. If the sum is less than a threshold, such as 0, supplemental content selection system 202 may not select any line item and not deliver an instance of supplemental content in the opportunity. The value of "0" may represent a boundary between a positive outcome and a negative outcome. A positive outcome is when delivering the instance of supplemental content is positive, and may be when a positive sum is associated with the instance of supplemental content being delivered (e.g., the sum is greater than 0). If a negative utility is associated with delivering the instance (e.g., the sum is negative), then supplemental content selection system 202 may not deliver the instance because this may be considered having a negative effect on the system. In a simple example, if the highest-ranked instance will provide a negative effect on a user account that views the instance, then that instance should not be delivered. A negative effect may be an instance of supplemental content that is not relevant to the user account.

As instances of supplemental content are delivered, the parameters may be updated in real-time. The following will now describe the parameter update process in more detail.

Parameter Update Process

Figure 4:
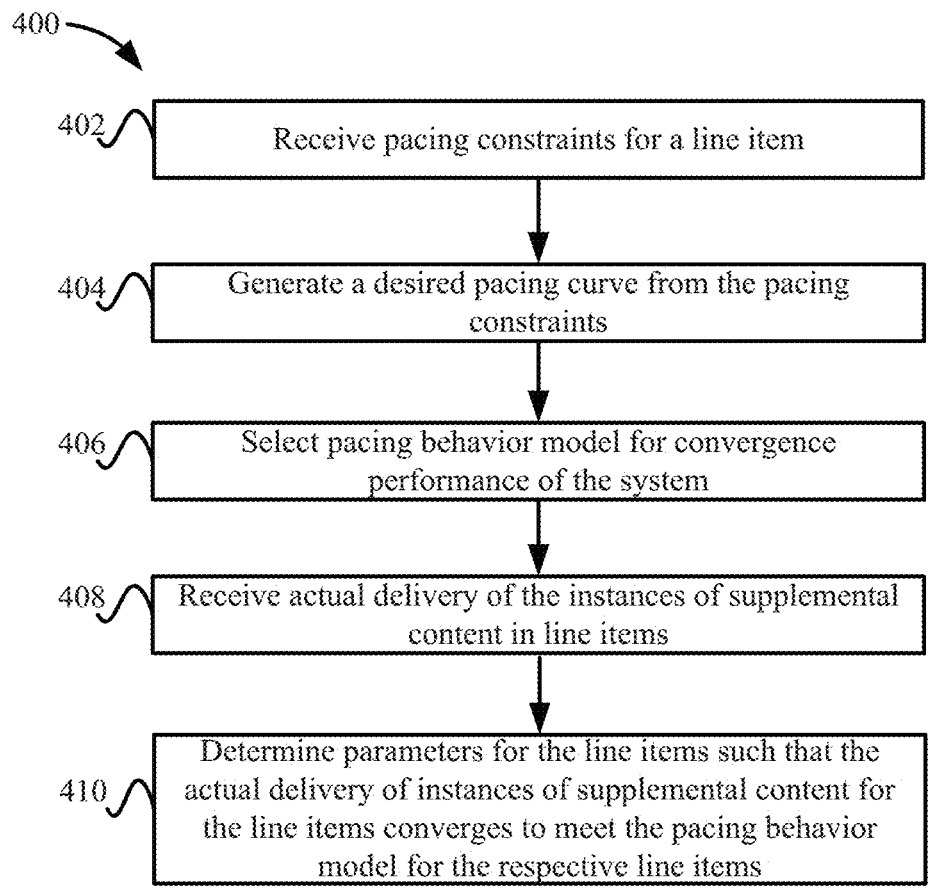
FIG. 4 depicts a simplified flowchart of a method for updating parameters according to some embodiments.

FIG. 4 depicts a simplified flowchart 400 of a method for updating parameters according to some embodiments. At 402, parameter updater 206 receives pacing constraints for a line item. The pacing constraints may indicate the desired delivery characteristics of the line item. As described above, an even pace may be described where the instance should be delivered approximately evenly across the schedule. However, other pacing constraints may also be appreciated, such as delivering the instance at a first rate within a first time period and a second rate within a second time period, wherein the first rate and the second rate are different rates.

At 404, parameter updater 206 generates a representation that is referred to as a desired pacing curve from the pacing constraints. The desired pacing curve may define the desired pacing constraints over time. If the pacing constraint for a line item is an even pacing for the time period, then the desired pacing curve may be defined as a straight line at a constant value over the time period. However, if the pacing constraints change over time, then the desired pacing curve may vary in value across the time period. The desired pacing curve is described as a curve, but may be any representation of the pacing constraints over time.

At 406, parameter updater 206 selects a pacing behavior model that describes the performance of delivery of instances of supplemental content for a line item by supplemental content system 108. The pacing behavior model may guide how delivery of instances of supplemental content for the line item converge to the desired pacing curve over the time period. This guides the behavior of the selection by supplemental content selection system 202 to meet the pacing behavior model, and does not describe how to meet the desired pacing curve. The pacing behavior model will be described in more detail below in FIG. 5. The above process may be performed for all line items to set the desired pacing curve and the pacing behavior model for each respective line item.

Parameter updater 206 may then adjust parameters in real-time. The adjustment process may be performed using different methods. For example, the parameters for all instances of supplemental content may be adjusted together to meet respective pacing behavior models. However, individual line items may also be adjusted. The following will describe adjusting parameters for all line items together. At 408, parameter updater 206 receives input for adjusting the parameters. As discussed above, the input may include information for supplemental content requests from inventory pool 204 and the cumulative delivery count for a line item At 410, pacing updater 208 determines parameters for the line items such that the actual delivery of instances of supplemental content for the line items converges to meet the pacing behavior model for the respective line items. An example of updating parameters will be described in more detail below after describing the pacing behavior in FIG. 5.

Pacing Behavior

Figure 5:
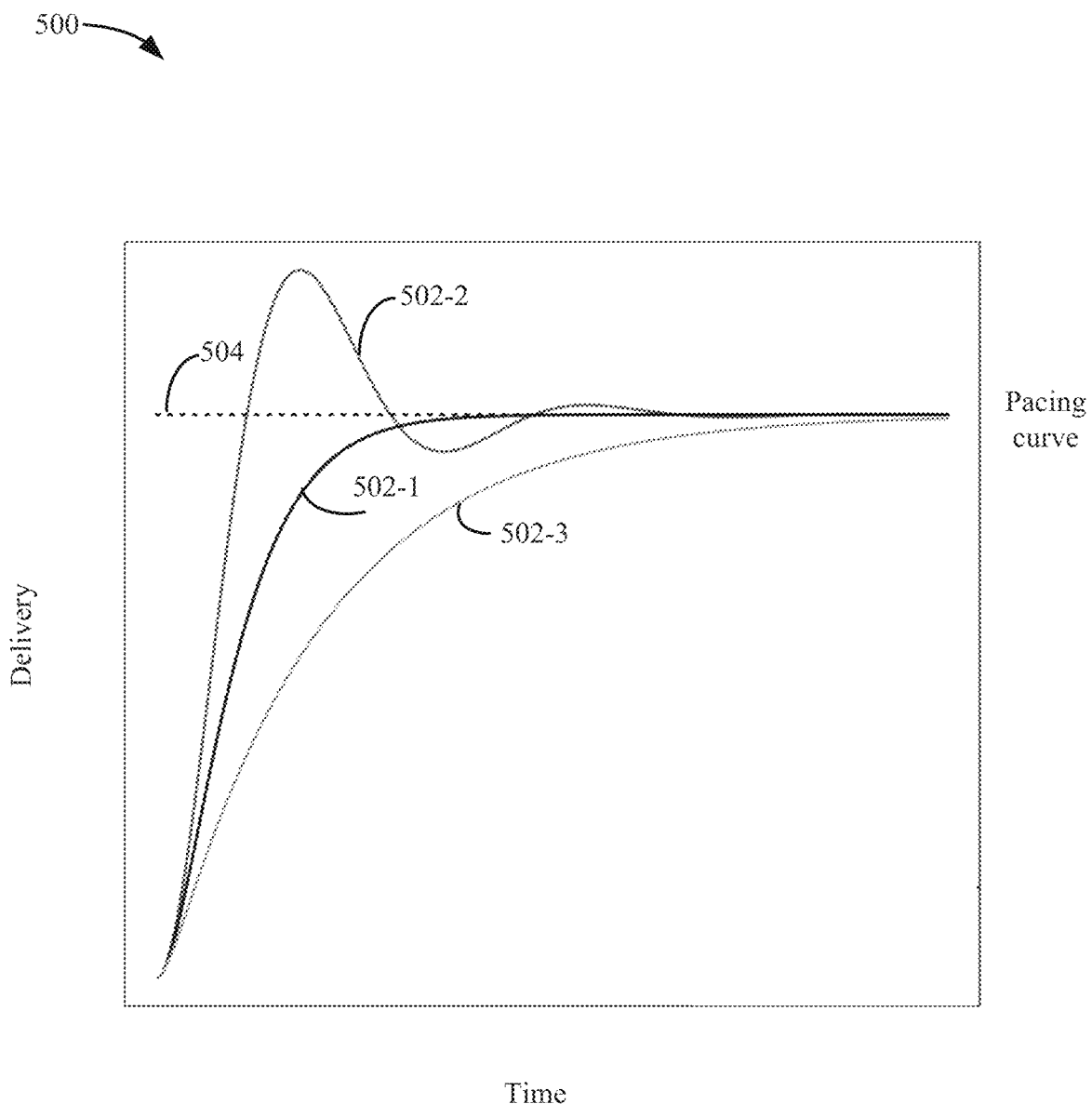
FIG. 5 depicts a graph that shows the relationship between pacing behavior over time according to some embodiments.

The pacing behavior may be selected based on the convergence performance that is desired for supplemental content system 108. The pacing behavior that is selected may have a known convergence property and if the parameters are updated to meet the pacing behavior, then the convergence may be known. FIG. 5 depicts a graph 500 that shows the relationship between pacing behavior over time according to some embodiments. The Y axis of graph 500 may represent the delivery of instances of supplemental content for a line item and the X axis represents time over a time period.

Different representations of pacing behavior are shown at 502-1, 502-2, and 502-3. Also, a representation of pacing constraints is shown at 504 as a pacing curve. In this case, the pacing curve may be based on an even pacing constraint, which is represented by a straight line because the pacing constraints do not change over time. A pacing constraint that is not constant or at an even pace may use a curve that changes over time.

The characteristics of the pacing behavior may be defined by the representation shown at 502-1, 502-2, and 502-3. For example, representations 502-1, 502-2, and 502-3 may depict oscillatory systems in which the damping ratio for a second order differential equation is equal to 1, less than 1, and greater than 1 respectively. In some embodiments, the convergence to meet the pacing curve may be different. For example, the pacing behavior shown at 502-2 may be underdamped and oscillate around the pacing curve, such as by continually overshooting the pacing curve to the positive side and then undershooting the pacing curve to the negative side before converging to the pacing constraints. Also, the pacing behavior at 502-3 may be overdamped and may take a longer period of time to reach the pacing curve, but does not overshoot the pacing curve to the positive side. The pacing behavior at 502-1 may be critically damped and may be in between the overdamped and underdamped behaviors of the pacing behaviors shown at 502-2 and 502-3, such as around the border between the behaviors or in the middle of the behaviors. The critically damped pacing behavior at 502-1 may not oscillate as much as the pacing behavior at 502-2 and may reach the pacing curve faster than the pacing behavior at 502-3.

Example

The following describes an example of updating parameters. It is noted that different pacing curves and pacing behaviors may be used. The desired pacing curve may describe the ideal cumulative delivered instances (e.g., impressions) at a given time for each instance of supplemental content E(T). Suppose there is a desired pacing curve E(t) for each line item j. This function may be predefined and parameter updater 206 can determine the expected cumulative delivery impression at any time t. In some embodiments, the pacing constraints for the line items should have an even pacing along each respective time period. In such a situation, the pacing curve (t) can be defined as a straight-line. For example, if it is required that a line item with a schedule from the time period 0-T should deliver G impressions in total in an evenly-paced manner, the desired pacing curve can be defined as a straight line according to the requirement of E(t)=t/T G, where t is the current time and T is the time period.

The pacing behavior describes how the actual delivery $D_j(t)$ dynamically approaches the desired pacing curve. The delivery of each line item j is described by the actual delivery over time T, which is observable via sampling requests for inventory pool 204. The difference between actual delivery and the pacing curve is defined as $\delta(\ )=D(t)-E(t)$. The sampling requests model the competition between line items. For example, assume there are 100 requests in which instance A qualified, 200 requests in which instance B qualified, and 50 requests in which both instance A and instance B qualified. From this, the competition may be determined as 50% of the opportunities for instance A are competitive with instance B (e.g., both A and B qualified/total qualified A)=50/100) and 25% opportunities of instance B are competitive with instance A (e.g., both A and B qualified/total qualified B)=50/200). As competition can happen in any combination of more than one instance, every request with all the qualified instances can capture the full picture of competition between line items.

The following parameter adjustment focuses on the system level pacing performance of line items in a time period 0-. The total opportunities is supposed to be N opportunities that are distributed evenly along the timeline. In the following, the line item index j is omitted if it does not cause ambiguity. The selection of the pacing behavior determines the convergence property of the system. The pacing behavior may be selected based on the predictable pacing performance over time. In some examples, the pacing behavior may be selected as a second order differential equation as follows:

$$\delta''(t) + 2\left(\frac{2\pi}{\tau}\right)\delta(t) + \left(\frac{2\pi}{\tau}\right)^2 \delta(t) = 0, \delta(t) = D(t) - E(t)$$

In the above equation, the symbol δ(t) represents the difference between the actual delivery and the desired pacing curve. The values of $$2\left(\frac{2\pi}{\tau}\right)$$

and $$\left(\frac{2\pi}{\tau}\right)^2$$

may be values $K_d$ and $k_p$ that are set to optimize performance, where 2π/τ is the natural frequency. The differential equation corresponds to the difference between the actual delivery curve D(t) and the desired pacing curve E(t). The differential equation may model a dynamic pacing behavior and the convergence of the second order differential equation may be known. The pacing behavior may guarantee convergence in about 2τ time with minimal oscillation because this pacing behavior follows the critical damping curve at 502-1 in FIG. 5. In the above, the second order differential equation is set at 0 and the dynamic behavior is equal to D(t)–E(t).

The selection probability for line item j is denoted as $\rho_j$ according to the selection algorithm used by supplemental content selection system 202 (e.g., $\rho_j$ is a function of the parameter α). Then, $$\dot{\delta}(t) = \dot{D}(t) - \dot{E}(t) = \frac{N}{T}\rho(t) - \dot{E}(t).$$

Taking the derivative with respect to time yields:

$$\ddot{\delta}(t) = \frac{N}{T}\dot{\rho}(t) - \ddot{E}(t).$$

The second order differential equation can be reformulated as:

$$\dot{\rho}(t) = \frac{T}{N}\ddot{E}(t) - k_d\left(\rho(t) - \frac{T}{N}\dot{E}(t)\right) - k_p\frac{T}{N}(D(t) - E(t))$$

Parameter updater 206 can estimate the value of ρ because the righthand side is fully known. Parameter updater 206 calculates the updated parameter (t+Δt) such that:

$$\rho_j(\vec{\alpha}(t + \Delta t)) = \rho_j(\vec{\alpha}(t)) + \dot{\rho}_j(t)\Delta t \ \forall \ j,$$

where Δt is the time interval between two consecutive updates of the parameter. Given the above, parameter updater 206 calculates (t) given parameter $\vec{\alpha}(t)$ and solving $\vec{\alpha}(t+\Delta t)$ in above equation.

By determining the parameters that satisfy the pacing behavior for the instance, the process may use a process that iteratively reduces the difference between the actual delivery and the desired pacing curve based on the pacing behavior. For example, an iterative gradient descent algorithm may be used, but other algorithms may be used. The iterative gradient descent algorithm may adjust the parameters each iteration such that the actual delivery will move closer to the pacing behavior.

In this parameter update, $\Delta t$ is usually very small, and $\rho(t+\Delta t)$ is then not very different from the value of $\rho(t)$. Accordingly, parameter updater 206 can calculate the partial derivative of $\rho_j$ with respect to $\alpha_j$: $\partial \rho j / \partial \alpha j$, $1 \leq j \leq n$.

Parameter updater 206 can apply an algorithm to iteratively solve the problem, such as a gradient descent algorithm that can achieve convergence in a small number of iterations every time the parameters are updated. A method that uses repeated random sampling, such as a Monte Carlo method, may be used to estimate $\rho$ based on the input from the inventory pool. For example, $\partial \rho j / \partial \alpha j$ can be estimated via:

$$\rho_j \approx \frac{1}{M} \Sigma_{1 \leq i \leq M} \hat{\rho_j}(\vec{\alpha}; \omega_i), \forall j$$

$$\frac{\partial \rho j}{\partial \alpha j} = \frac{1}{M} \Sigma_{1 \leq i \leq M} \frac{\partial \hat{\rho_j}}{\partial \alpha j}(\vec{\alpha}; \omega_i), \forall j$$

The variable $\omega_i$ is the supplemental content slot of index i, the qualified line items are 1, 2, . . . , q, and the parameters are $\alpha_1, \alpha_2, \ldots, \alpha_q$. Parameter updater 206 estimates $\rho_j$ and the partial derivative of $\rho_j$ with respect to $\alpha_j$: $\partial \rho j / \partial \alpha j$. The expected pacing behavior is translated into an expected value of $\rho$. The calculated value of $\rho_j$ and the gradient of $\partial \rho j / \partial \alpha j$ is used in the gradient descent algorithm to adjust the parameter $\alpha$.

In some examples, $\rho_j$ is estimated via:

$$\rho_j \approx P(u_j + \alpha_j \geq \max(0, \max_{k \neq j} u_k + \alpha_k)),$$

where the utility is $u_1, u_2, \ldots, u_q$. The above estimates $\rho_j$ based on the utility and the actual delivery. Also, the conditional distribution of $u_j$ given $u_k$ other than j has a cumulative distribution function of $F_{j|k \neq j}(u_j)$. Then, the derivative of $\rho_j$ may be:

$$\frac{\partial \hat{\rho_j}}{\partial \alpha j}(\vec{\alpha}) = F'_{j|k \neq j}(\max(0, \max_{k \neq j} u_k + \alpha_k) - a_j).$$

The above determines the derivative of $\rho_j$ based the utility and the actual delivery. Accordingly, the pacing behavior from the actual delivery of a prior parameter update and the pacing behavior from the actual delivery of a current parameter update is a function of utility and the parameter. Also, the parameter $\alpha$ can be updated to meet the desired pacing behavior using a gradient of change between the desired pacing behavior and the pacing behavior of the actual delivery. The value of the parameter $\alpha$ can be updated to move along the gradient of change. The process iteratively adjusts the parameter $\alpha$ until the parameter meets the desired pacing behavior.

Conclusion

By adjusting a parameter to meet the pacing behavior, the performance of the supplemental content system may converge to a desired pacing curve with a known performance.

System

Figure 6:
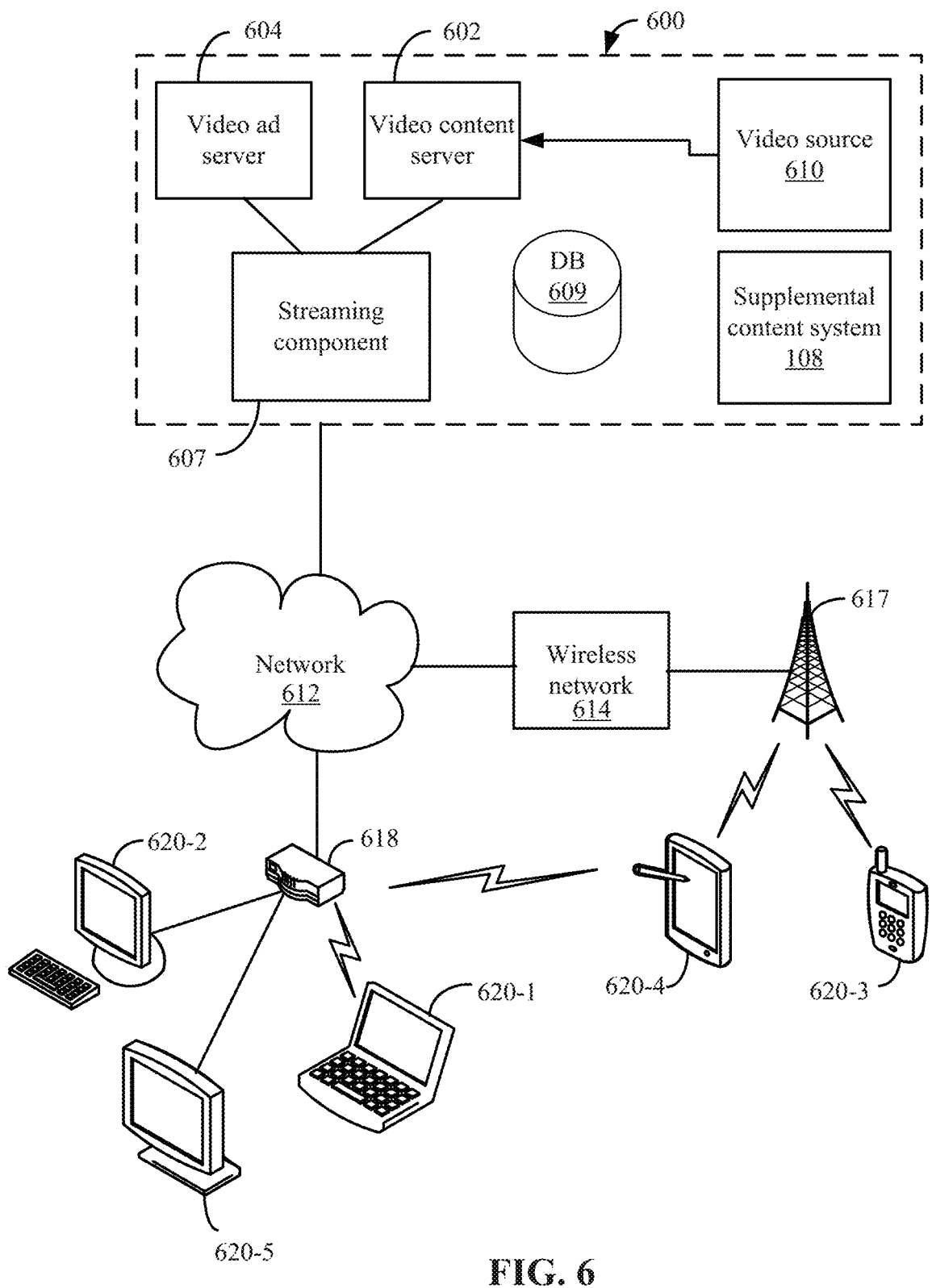
FIG. 6 depicts a video streaming system in communication with multiple client devices via one or more communication networks according to one embodiment.

Features and aspects as disclosed herein may be implemented in conjunction with a video streaming system 600 in communication with multiple client devices via one or more communication networks as shown in FIG. 6. Aspects of the video streaming system 600 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 600, video data may be obtained from one or more sources for example, from a video source 610, for use as input to a video content server 602. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 600 may include one or more computer servers or modules 602, 604, and/or 607 distributed over one or more computers. Each server 602, 604, 607 may include, or may be operatively coupled to, one or more data stores 609, for example databases, indexes, files, or other data structures. A video content server 602 may access a data store (not shown) of various video segments. The video content server 602 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 604 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 600, a public service message, or some other information. The video advertising server 604 may serve the video advertising segments as directed by a user interface controller (not shown).

The video streaming system 600 also may include supplemental content system 108.

The video streaming system 600 may further include an integration and streaming component 607 that integrates video content and video advertising into a streaming video segment. For example, streaming component 607 may be a content server or streaming media server. A controller (not shown) may determine the selection or configuration of advertising in the streaming video based on any suitable algorithm or process. The video streaming system 600 may include other modules or units not depicted in FIG. 6, for example, administrative servers, commerce servers, network infrastructure, advertising selection engines, and so forth.

The video streaming system 600 may connect to a data communication network 612. A data communication network 612 may comprise a local area network (LAN), a wide area network (WAN), for example, the Internet, a telephone network, a wireless cellular telecommunications network (WCS) 614, or some combination of these or similar networks.

One or more client devices 620 may be in communication with the video streaming system 600, via the data communication network 612, wireless cellular telecommunications network 614, and/or another network. Such client devices may include, for example, one or more laptop computers 620-1, desktop computers 620-2, "smart" mobile phones 620-3, tablet devices 620-4, network-enabled televisions 620-5, or combinations thereof, via a router 618 for a LAN, via a base station 617 for a wireless cellular telecommunications network 614, or via some other connection. In operation, such client devices 620 may send and receive data or instructions to the system 600, in response to user input received from user input devices or other input. In response, the system 600 may serve video segments and metadata from the data store 609 responsive to selection of media programs to the client devices 620. Client devices 620 may output the video content from the streaming video segment in a media player using a display screen, projector, or other video output device, and receive user input for interacting with the video content.

Distribution of audio-video data may be implemented from streaming component 607 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 607 may communicate with client device 620 using control messages and data messages to adjust to changing network conditions as the video is played. These control messages can include commands for enabling control functions such as fast forward, fast reverse, pausing, or seeking to a particular part of the file at the client.

Since streaming component 607 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 607 may use TCP-based protocols, such as HyperText Transfer Protocol (HTTP) and Real Time Messaging Protocol (RTMP). Streaming component 607 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 7:
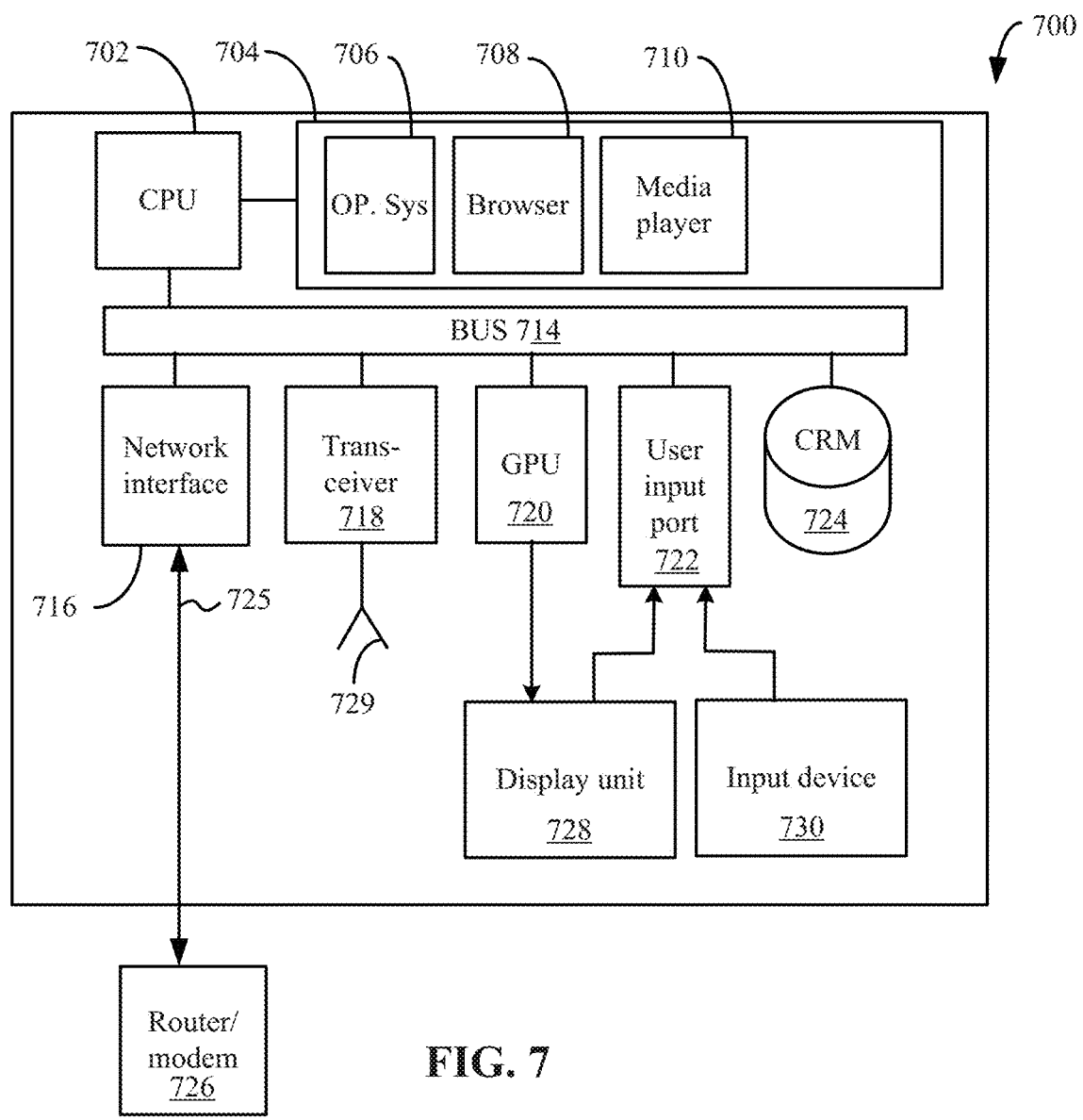
FIG. 7 depicts a diagrammatic view of an apparatus for viewing video content and advertisements.

Referring to FIG. 7, a diagrammatic view of an apparatus 700 for viewing video content and advertisements is illustrated. In selected embodiments, the apparatus 700 may include a processor (CPU) 702 operatively coupled to a processor memory 704, which holds binary-coded functional modules for execution by the processor 702. Such functional modules may include an operating system 706 for handling system functions such as input/output and memory access, a browser 708 to display web pages, and media player 710 for playing video. The memory 704 may hold additional modules not shown in FIG. 7, for example modules for performing other operations described elsewhere herein.

A bus 714 or other communication component may support communication of information within the apparatus 700. The processor 702 may be a specialized or dedicated microprocessor configured or operable to perform particular tasks in accordance with the features and aspects disclosed herein by executing machine-readable software code defining the particular tasks. Processor memory 704 (e.g., random access memory (RAM) or other dynamic storage device) may be connected to the bus 714 or directly to the processor 702, and store information and instructions to be executed by a processor 702. The memory 704 may also store temporary variables or other intermediate information during execution of such instructions.

A computer-readable medium in a storage device 724 may be connected to the bus 714 and store static information and instructions for the processor 702; for example, the storage device (CRM) 724 may store the modules 706, 708, 710 and 712 when the apparatus 700 is powered off, from which the modules may be loaded into the processor memory 704 when the apparatus 700 is powered up. The storage device 724 may include a non-transitory computer-readable storage medium holding information, instructions, or some combination thereof, for example instructions that when executed by the processor 702, cause the apparatus 700 to be configured or operable to perform one or more operations of a method as described herein.

A communication interface 716 may also be connected to the bus 714. The communication interface 716 may provide or support two-way data communication between the apparatus 700 and one or more external devices, e.g., the streaming system 600, optionally via a router/modem 726 and a wired or wireless connection. In the alternative, or in addition, the apparatus 700 may include a transceiver 718 connected to an antenna 729, through which the apparatus 700 may communicate wirelessly with a base station for a wireless communication system or with the router/modem 726. In the alternative, the apparatus 700 may communicate with a video streaming system 600 via a local area network, virtual private network, or other network. In another alternative, the apparatus 700 may be incorporated as a module or component of the system 600 and communicate with other components via the bus 714 or by some other modality.

The apparatus 700 may be connected (e.g., via the bus 714 and graphics processing unit 720) to a display unit 728. A display 728 may include any suitable configuration for displaying information to an operator of the apparatus 700. For example, a display 728 may include or utilize a liquid crystal display (LCD), touchscreen LCD (e.g., capacitive display), light emitting diode (LED) display, projector, or other display device to present information to a user of the apparatus 700 in a visual display.

One or more input devices 730 (e.g., an alphanumeric keyboard, microphone, keypad, remote controller, game controller, camera, or camera array) may be connected to the bus 714 via a user input port 722 to communicate information and commands to the apparatus 700. In selected embodiments, an input device 730 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 728, for example using a touch sensitive screen. A cursor control device may communicate direction information and command selections to the processor 702 and control cursor movement on the display 728. A cursor control device may have two or more degrees of freedom, for example allowing the device to specify cursor positions in a plane or three-dimensional space.

Example Embodiments

In some embodiments, a method comprising: receiving, by a computing device, information for a delivery of instances of supplemental content for a plurality of line items, wherein a line item is associated with an instance of supplemental content that can be delivered and a pacing curve that describes a pace of delivery over time; updating, by the computing device, a parameter for the line item to generate an updated parameter based on the information for the delivery of the instances of supplemental content and a desired pacing behavior; and providing, by the computing device, the updated parameter to a selection system, wherein the selection system uses the updated parameter to select an instance of supplemental content for a line item for delivery, and wherein the delivery of instances of supplemental content for the line item is adjusted to meet the pacing curve based on a characteristic of the pacing behavior.

In some embodiments, the selection system uses the updated parameter in real-time to select a line item in the plurality of line items for the new opportunity.

In some embodiments, parameters for the plurality of line items are updated together.

In some embodiments, the method further comprising: receiving the pacing constraint for the line item, wherein the pacing curve defines the pacing constraint over a time period.

In some embodiments, the method further comprising: receiving the pacing behavior for the line item, wherein the pacing behavior is defined based on the characteristic.

In some embodiments, the characteristic of the pacing behavior guides delivery of the instance of supplemental content to meet to the pacing curve.

In some embodiments, the selection system selects a line item for a new request based on a utility value and a value for the parameter for a set of line items in the plurality of line items, wherein the utility value is based on an objective that is measured based on a delivery of the instance of supplemental content.

In some embodiments, the line item that is selected maximizes the utility value and the value for the parameter.

In some embodiments, the selection system: calculates a combination value of the utility value and the value for the parameter for each line item, and selects the line item with the highest combination value.

In some embodiments, the selection system: compares the combination value to a threshold, selects the line item for delivery when the combination value meets the threshold, and determines that the line item should not be delivered when the combination value does not meet the threshold.

In some embodiments, the pacing behavior comprises a differential equation.

In some embodiments, the characteristic of the pacing behavior comprises a damping ratio of the differential equation.

In some embodiments, updating the parameter comprises: updating the parameter based on a gradient of a difference between the desired pacing behavior and an actual pacing behavior, wherein the actual pacing behavior is calculated based on the information for the delivery of the instances of supplemental content.

In some embodiments, the actual pacing behavior is based on a utility value for the line item and a value for the parameter of the line item, wherein the utility value is based on an objective that is measured based on a delivery of the instance of supplemental content.

In some embodiments, the information for the delivery of the instances of supplemental content comprises instances of supplemental content for line items that qualified for a set of previous requests for delivery of an instance of supplemental content.

In some embodiments, updating the parameter is based on adjusting the parameter such that the delivery of the instance of supplemental content converges to meet the desired pacing behavior.

In some embodiments, a non-transitory computer-readable storage medium containing instructions, that when executed, control a computer system to be operable for: receiving information for a delivery of instances of supplemental content for a plurality of line items, wherein a line item is associated with an instance of supplemental content that can be delivered and a pacing curve that describes a pace of delivery over time; updating a parameter for the line item to generate an updated parameter based on the information for the delivery of the instances of supplemental content and a desired pacing behavior; and providing the updated parameter to a selection system, wherein the selection system uses the updated parameter to select an instance of supplemental content for a line item for delivery, and wherein the delivery of instances of supplemental content for the line item is adjusted to meet the pacing curve based on a characteristic of the pacing behavior.

In some embodiments, the selection system selects a line item for a new request based on a utility value and a value for the parameter for a set of line items in the plurality of line items, wherein the utility value is based on an objective that is measured based on a delivery of the instance of supplemental content.

In some embodiments, updating the parameter is based on adjusting the parameter such that the delivery of the instance of supplemental content converges to meet the desired pacing behavior.

In some embodiments, an apparatus comprising: one or more computer processors; and a non-transitory computer-readable storage medium comprising instructions, that when executed, control the one or more computer processors to be operable for: receiving information for a delivery of instances of supplemental content for a plurality of line items, wherein a line item is associated with an instance of supplemental content that can be delivered and a pacing curve that describes a pace of delivery over time; updating a parameter for the line item to generate an updated parameter based on the information for the delivery of the instances of supplemental content and a desired pacing behavior; and providing the updated parameter to a selection system, wherein the selection system uses the updated parameter to select an instance of supplemental content for a line item for delivery, and wherein the delivery of instances of supplemental content for the line item is adjusted to meet the pacing curve based on a characteristic of the pacing behavior.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   receiving, by a computing device, information for a delivery of instances of supplemental content for a plurality of line items, wherein a line item is associated with an instance of supplemental content that can be delivered and a pacing curve that describes a pace of delivery over time;
   determining, by the computing device, a difference between the delivery of the instance of supplemental content for the line item and the pacing curve;
   determining, by the computing device, a model of a desired pacing behavior using a parameter and the difference, wherein the desired pacing behavior is associated with a convergence property;
   updating, by the computing device, a value for the parameter for the line item to generate an updated value, wherein the updated value reduces the difference between the delivery of the instance of supplemental content for the line item and the pacing curve to satisfy the delivery of the instance of supplemental content for the line item and the pacing curve based on the convergence property of the desired pacing behavior; and
   providing, by the computing device, the updated parameter to a selection system, wherein the selection system uses the updated parameter to select an instance of supplemental content for a line item for delivery, and wherein the delivery of instances of supplemental content for the line item is adjusted to meet the pacing curve based on convergence property of the pacing behavior.

2. The method of claim 1, wherein the selection system uses the updated parameter in real-time to select a line item in the plurality of line items for a new opportunity.

3. The method of claim 1, wherein parameters for the plurality of line items are updated together.

4. The method of claim 1, further comprising:
   receiving the pacing constraint for the line item, wherein the pacing curve defines a pacing constraint over a time period.

5. The method of claim 1, further comprising:
   receiving the pacing behavior for the line item, wherein the pacing behavior is defined based on the convergence property.

6. The method of claim 1, wherein the convergence property of the pacing behavior guides delivery of the instance of supplemental content to meet to the pacing curve.

7. The method of claim 1, wherein the selection system selects a line item for a new request based on a utility value and a value for the parameter for a set of line items in the plurality of line items, wherein the utility value is based on an objective that is measured based on a delivery of the instance of supplemental content.

8. The method of claim 7, wherein the line item that is selected maximizes the utility value and the value for the parameter.

9. The method of claim 7, wherein the selection system:
calculates a combination value of the utility value and the value for the parameter for each line item, and
selects the line item with the highest combination value.

10. The method of claim 7, wherein the selection system: compares the combination value to a threshold,
selects the line item for delivery when the combination value meets the threshold, and
determines that the line item should not be delivered when the combination value does not meet the threshold.

11. The method of claim 1, wherein the model of the desired pacing behavior comprises a differential equation.

12. The method of claim 11, wherein the convergence property of the pacing behavior comprises a damping ratio of the differential equation.

13. The method of claim 1, wherein updating the parameter comprises:
updating the parameter based on a gradient of a difference between the desired pacing behavior and an actual pacing behavior, wherein the actual pacing behavior is calculated based on the information for the delivery of the instances of supplemental content.

14. The method of claim 13, wherein the actual pacing behavior is based on a utility value for the line item and a value for the parameter of the line item, wherein the utility value is based on an objective that is measured based on a delivery of the instance of supplemental content.

15. The method of claim 1, wherein the information for the delivery of the instances of supplemental content comprises instances of supplemental content for line items that qualified for a set of previous requests for delivery of an instance of supplemental content.

16. The method of claim 1, wherein updating the parameter is based on adjusting the parameter such that the delivery of the instance of supplemental content iteratively reduces the difference between the actual delivery and the pacing curve based on the desired pacing behavior.

17. A non-transitory computer-readable storage medium containing instructions, that when executed, control a computer system to be operable for:
receiving information for a delivery of instances of supplemental content for a plurality of line items, wherein a line item is associated with an instance of supplemental content that can be delivered and a pacing curve that describes a pace of delivery over time;
determining a difference between the delivery of the instance of supplemental content for the line item and the pacing curve;
determining a model of a desired pacing behavior using a parameter and the difference, wherein the desired pacing behavior is associated with a convergence property;
updating a value for the parameter for the line item to generate an updated value, wherein the updated value reduces the difference between the delivery of the instance of supplemental content for the line item and the pacing curve to satisfy the delivery of the instance of supplemental content for the line item and the pacing curve based on the convergence property of the desired pacing behavior; and
providing the updated parameter to a selection system, wherein the selection system uses the updated parameter to select an instance of supplemental content for a line item for delivery, and wherein the delivery of instances of supplemental content for the line item is adjusted to meet the pacing curve based on convergence property of the pacing behavior.

18. The non-transitory computer-readable storage medium of claim 17, wherein the selection system selects a line item for a new request based on a utility value and a value for the parameter for a set of line items in the plurality of line items, wherein the utility value is based on an objective that is measured based on a delivery of the instance of supplemental content.

19. The non-transitory computer-readable storage medium of claim 18, wherein updating the parameter is based on adjusting the parameter such that the delivery of the instance of supplemental content iteratively reduces the difference between the actual delivery and the pacing curve based on the desired pacing behavior.

20. An apparatus comprising:
one or more computer processors; and
a non-transitory computer-readable storage medium comprising instructions, that when executed, control the one or more computer processors to be operable for:
receiving information for a delivery of instances of supplemental content for a plurality of line items, wherein a line item is associated with an instance of supplemental content that can be delivered and a pacing curve that describes a pace of delivery over time;
determining a difference between the delivery of the instance of supplemental content for the line item and the pacing curve;
determining a model of a desired pacing behavior using a parameter and the difference, wherein the desired pacing behavior is associated with a convergence property;
updating a value for the parameter for the line item to generate an updated value, wherein the updated value reduces the difference between the delivery of the instance of supplemental content for the line item and the pacing curve to satisfy the delivery of the instance of supplemental content for the line item and the pacing curve based on the convergence property of the desired pacing behavior; and
providing the updated parameter to a selection system, wherein the selection system uses the updated parameter to select an instance of supplemental content for a line item for delivery, and wherein the delivery of instances of supplemental content for the line item is adjusted to meet the pacing curve based on convergence property of the pacing behavior.

\* \* \* \* \*